(12) United States Patent
Zhao

(10) Patent No.: US 11,343,801 B2
(45) Date of Patent: May 24, 2022

(54) FEEDBACK INFORMATION TRANSMISSION METHOD AND APPARATUS

(71) Applicant: HUAWEI TECHNOLOGIES CO., LTD., Guangdong (CN)

(72) Inventor: Zhenshan Zhao, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/503,265

(22) Filed: Jul. 3, 2019

(65) Prior Publication Data

US 2019/0327724 A1    Oct. 24, 2019

Related U.S. Application Data

(63) Continuation of application No. PCT/CN2018/072110, filed on Jan. 10, 2018.

(30) Foreign Application Priority Data

Jan. 17, 2017 (CN) .......................... 201710041111.0

(51) Int. Cl.
*H04W 72/04* (2009.01)
*H04L 5/00* (2006.01)
(Continued)

(52) U.S. Cl.
CPC ....... *H04W 72/0406* (2013.01); *H04L 5/0005* (2013.01); *H04L 27/2614* (2013.01); *H04W 92/18* (2013.01)

(58) Field of Classification Search
CPC .............. H04W 72/0406; H04W 92/18; H04L 5/0005; H04L 5/0044; H04L 5/0055;
(Continued)

(56) References Cited

U.S. PATENT DOCUMENTS

2015/0023267 A1    1/2015  Lim et al.
2016/0066337 A1*   3/2016  Sartori .............. H04W 72/0406
                                                370/329
(Continued)

FOREIGN PATENT DOCUMENTS

CN        105553612 A      5/2016
CN        106063352 A     10/2016
(Continued)

OTHER PUBLICATIONS

R1-1707041 Huawei et al.,"Sidelink link adaptation with feedback information for FeD2D",3GPP TSG RAN WG1 Meeting #89,Hangzhou, China, May 15-19, 2017,total 2 pages.
(Continued)

*Primary Examiner* — Habte Mered
(74) *Attorney, Agent, or Firm* — Womble Bond Dickinson (US) LLP

(57) ABSTRACT

Embodiments of the present invention describe a feedback information transmission method and apparatus. The feedback information transmission method may include receiving, by a first terminal, first data sent by a second terminal. The method may also include sending, by the first terminal, feedback information for the first data to the second terminal in a first subframe, where there is second data to be sent by the first terminal in the first subframe. The feedback information may be carried in sidelink control information (SCI) of the second data, or the feedback information may be carried in a data packet carrying the second data. According to the embodiments of the present invention, the feedback information is carried in the SCI or the data packet carrying the second data, so that a peak-to-average power ratio (PAPR) of a system can be reduced.

14 Claims, 8 Drawing Sheets

(51) Int. Cl.
H04L 27/26 (2006.01)
H04W 92/18 (2009.01)

(58) Field of Classification Search
CPC ... H04L 5/0091; H04L 27/2614; H04L 27/26; H04L 1/1664; H04L 1/1864; H04L 1/1671; H04L 1/1607; H04L 2001/0093
See application file for complete search history.

(56) References Cited

U.S. PATENT DOCUMENTS

| | | | |
|---|---|---|---|
| 2016/0198453 A1 | 7/2016 | Hu et al. | |
| 2016/0381666 A1 | 12/2016 | Kim et al. | |
| 2017/0347394 A1* | 11/2017 | Yasukawa | H04L 1/1896 |
| 2018/0049196 A1* | 2/2018 | Gupta | H04L 5/0048 |
| 2018/0116007 A1* | 4/2018 | Yasukawa | H04W 28/06 |
| 2019/0007974 A1* | 1/2019 | Nguyen | H04W 4/44 |
| 2019/0052411 A1* | 2/2019 | Chae | H04L 1/08 |
| 2020/0169984 A1* | 5/2020 | Lee | H04W 4/40 |

FOREIGN PATENT DOCUMENTS

| | | | |
|---|---|---|---|
| WO | 2013179269 A1 | 12/2013 | |
| WO | WO-2013179269 A1 * | 12/2013 | ........... H04L 1/0001 |
| WO | 2016076301 A1 | 5/2016 | |
| WO | 2016095119 A1 | 6/2016 | |
| WO | 2016163972 A1 | 10/2016 | |

OTHER PUBLICATIONS

R1-133148 ZTE,"Study on D2D Communication",3GPP TSG-RAN WG1 Meeting #74,Barcelona, Spain, Aug. 19-23, 2013,total 9 pages.

Ericsson,"MAC impacts of asynchronous HARQ for BL UEs and UEs in EC",3GPP TSG-RAN WG2 #93,Tdoc R2-161689,St. Julians, Malta, Feb. 15-19, 2016, total 10 pages.

* cited by examiner

FEEDBACK INFORMATION TRANSMISSION METHOD AND APPARATUS

CROSS-REFERENCE TO RELATED APPLICATIONS

This application is a continuation of International Application No. PCT/CN2018/072110, filed on Jan. 10, 2018, which claims priority to Chinese Patent Application No. 201710041111.0, filed on Jan. 17, 2017. The disclosures of the aforementioned applications are hereby incorporated by reference in their entireties.

TECHNICAL FIELD

The present disclosure relates to the field of communications technologies, and in particular, to a feedback information transmission method and apparatus.

BACKGROUND

Device-to-device (D2D) communication is a technology that supports mobile devices in performing direct data communication by using a dedicated air interface technology. A biggest difference from a conventional cellular communications technology is that device-to-device communication can be directly performed without a need of forwarding by a base station. The base station may perform resource configuration, scheduling, coordination, and the like to assist terminals in direct communication.

The D2D technology is discussed in 3GPP. In long term evolution (LTE) Rel. 12, data is transmitted through broadcast in the D2D technology, and the D2D technology includes two features: discovery and communication. The discovery means that a terminal periodically broadcasts information, so that a terminal surrounding the terminal can detect the information and discover the user. The communication means that direct data transmission is performed between two terminals, and a mechanism of scheduling assignment (SA)+data is used, as shown in FIG. 1.

The SA is state information used to indicate data sent from a transmit end. The SA carries sidelink control information (SCI). The SCI includes time-frequency resource information of the data, a modulation and coding scheme (MCS), and the like. A receive end can receive the data based on an indication of the SCI.

A communication mode of a D2D system is further divided into two working modes. Mode 1 is shown in (a) in FIG. 1, and Mode 2 is shown in (b) in FIG. 1. In Mode 1, a base station allocates a determined time-frequency resource in a resource pool to each D2D terminal for D2D transmission of the terminal. In Mode 2, a terminal randomly selects an SA resource from an SA resource pool, and randomly selects a data resource from a data resource pool for D2D transmission. A receive terminal blindly detects SA in the SA resource pool, and then detects data on a corresponding resource in the data resource pool by using time-frequency resource information indicated in the SA.

When a terminal sends data to another terminal in a subframe n in the D2D communication mode, the another terminal needs to send a feedback message in a subframe n+k. If the another terminal sends no data in the subframe n+k, the feedback message is separately sent on a feedback channel resource. If the another terminal sends data in the subframe n+k at the same time, there is a scenario in which the feedback information is sent on a feedback channel resource in the subframe, and the data is sent on a data channel resource in the same subframe. The another terminal sends the feedback information and data information on different frequency domain resources of the same subframe. This increases a peak-to-average power ratio (PAPR) of a system, and consequently, an effective transmit power of the system is reduced, and a transmission distance is shortened.

SUMMARY

Embodiments of the present invention provide a feedback information transmission method, where feedback information is carried in SCI or a data packet carrying second data, so that a PAPR of a system can be reduced.

According to a first aspect, an embodiment of the present invention provides a feedback information transmission method, including: receiving, by a first terminal, first data sent by a second terminal; and sending, by the first terminal, feedback information for the first data to the second terminal in a first subframe, where there is second data to be sent by the first terminal in the first subframe.

The feedback information may be carried in sidelink control information SCI of the second data, or the feedback information may be carried in a data packet carrying the second data.

In a possible embodiment, when receiving the first data sent by the second terminal, the first terminal may receive, in a second subframe, the first data sent by the second terminal. There are a preset quantity of subframes between the first subframe and the second subframe. For example, if an identifier of the second subframe is n, an identifier of the first subframe is n+k, where n is an integer greater than or equal to 0, and k is a natural number greater than or equal to 1. The preset quantity may be configured by a base station or may be preconfigured.

In a possible embodiment, if the feedback information is carried in the data packet carrying the second data, the data packet further carries identification information of the first terminal and/or identification information of the second terminal.

In a possible embodiment, if the feedback information is carried in the data packet carrying the second data, quantity indication information of the feedback information is carried in the sidelink control information SCI of the second data, and the quantity indication information is used to indicate a quantity of feedback information carried in the data packet.

According to a second aspect, an embodiment of the present invention provides a feedback information transmission method, including: sending, by a first terminal, data to at least two second terminals; and receiving, by the first terminal, feedback information that is for the data and that is sent by each of the at least two second terminals, where time-frequency resources occupied by feedback information that is for the data and that is sent by all the second terminals are different.

In a possible embodiment, an identifier of a time-frequency resource occupied by the feedback information that is for the data and that is sent by the second terminal is determined by using identification information of the first terminal and/or identification information of the second terminal; or a time-frequency resource occupied by the feedback information that is for the data and that is sent by the second terminal is indicated by the first terminal; or a time-frequency resource occupied by the feedback information that is for the data and that is sent by the second terminal is a time-frequency resource corresponding to the second terminal in a feedback resource set, the feedback resource set includes at least two time-frequency resources, and one second terminal corresponds to one time-frequency resource.

According to a third aspect, an embodiment of the present invention provides a feedback information transmission method, including: sending, by a first terminal, target data to a second terminal; detecting, by the first terminal on a preset feedback channel resource, whether there is feedback information sent by the second terminal; and retransmitting, by the first terminal, the target data if the first terminal detects no feedback information sent by the second terminal.

In a possible embodiment, the preset feedback channel resource is determined by using identification information of the first terminal and/or identification information of the second terminal; or the preset feedback channel resource includes a time-frequency resource between a first subframe and a second subframe, the first subframe is a predicted start location of the feedback information, and the second subframe is a predicted end location of the feedback information.

According to a fourth aspect, an embodiment of the present invention provides a feedback information transmission method, including: receiving, by a first terminal, first data sent by a second terminal; and sending, by the first terminal, feedback information for the first data to the second terminal on a feedback channel resource in a first subframe, where the first terminal does not send second data in the first subframe, and the second data is data to be sent by the first terminal in the first subframe.

According to a fifth aspect, an embodiment of the present invention provides a feedback information transmission apparatus, applied to a first terminal, where the feedback information transmission apparatus includes a receiving unit and a sending unit, the receiving unit is configured to receive first data sent by a second terminal, and the sending unit is configured to send feedback information for the first data to the second terminal in a first subframe, where there is second data to be sent by the first terminal in the first subframe.

The feedback information is carried in SCI of the second data; or the feedback information is carried in a data packet carrying the second data.

According to a sixth aspect, an embodiment of the present invention provides a feedback information transmission apparatus, applied to a first terminal, where the feedback information transmission apparatus includes a sending unit and a receiving unit, the sending unit is configured to send data to at least two second terminals, and the receiving unit is configured to receive feedback information that is for the data and that is sent by each of the at least two second terminals, where time-frequency resources occupied by feedback information that is for the data and that is sent by all the second terminals are different.

According to a seventh aspect, an embodiment of the present invention provides a feedback information transmission apparatus, applied to a first terminal, where the feedback information transmission apparatus includes a sending unit, a detection unit, and a retransmission unit, the sending unit is configured to send target data to a second terminal, the detection unit is configured to detect, on a preset feedback channel resource, whether there is feedback information sent by the second terminal, and the retransmission unit is configured to retransmit the target data if no feedback information sent by the second terminal is detected.

According to an eighth aspect, an embodiment of the present invention provides a feedback information transmission apparatus, applied to a first terminal, where the feedback information transmission apparatus includes a receiving unit and a sending unit, the receiving unit is configured to receive first data sent by a second terminal, and the sending unit is configured to send feedback information for the first data to the second terminal on a feedback channel resource in a first subframe, where the first terminal does not send second data in the first subframe, and the second data is data to be sent by the first terminal in the first subframe.

Through implementation of the embodiments of the present invention, the first terminal receives the first data sent by the second terminal, and the first terminal sends, in the first subframe, the feedback information for the first data to the second terminal. There is the second data to be sent by the first terminal in the first subframe. The feedback information may be carried in the SCI of the second data, or the feedback information may be carried in the data packet carrying the second data. The feedback information is carried in the SCI or the data packet carrying the second data, and the feedback information is not transmitted by using an additional frequency domain resource, so that a PAPR of a system can be reduced.

BRIEF DESCRIPTION OF DRAWINGS

To describe the technical solutions in the embodiments of the present invention more clearly, the following briefly describes the accompanying drawings required for the embodiments.

DESCRIPTION OF EMBODIMENTS

The following describes the embodiments of the present invention with reference to the accompanying drawings in the embodiments of the present invention.

Figure 2:
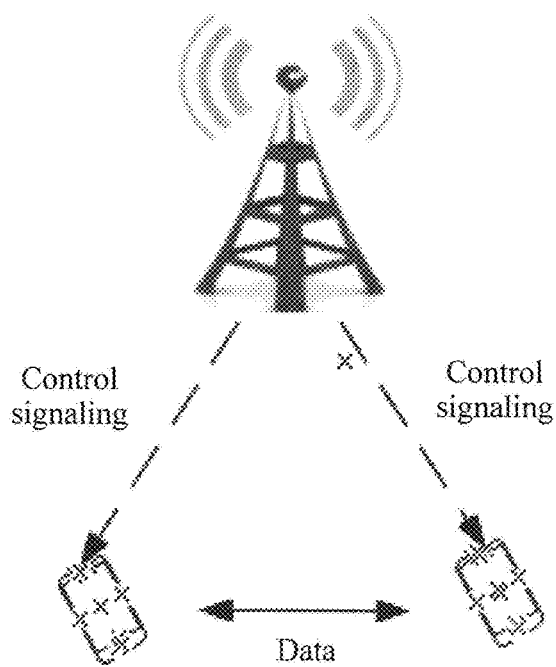
FIG. 2 is a schematic diagram of D2D communication according to an embodiment of the present invention.

FIG. 2 is a schematic architectural diagram of a D2D communications system according to an embodiment of the present invention. The D2D communications system includes a base station and a terminal. The base station is configured to allocate a time-frequency resource to the terminal, and the terminal performs D2D communication by using the time-frequency resource allocated by the base station. D2D is a technology used for direct end-to-end communication, and a biggest difference from a conventional cellular communications technology is that device-to-device communication can be directly performed without a need of forwarding by a base station. The base station may perform resource configuration, scheduling, coordination, and the like to assist terminals in direct communication.

Figure 1:
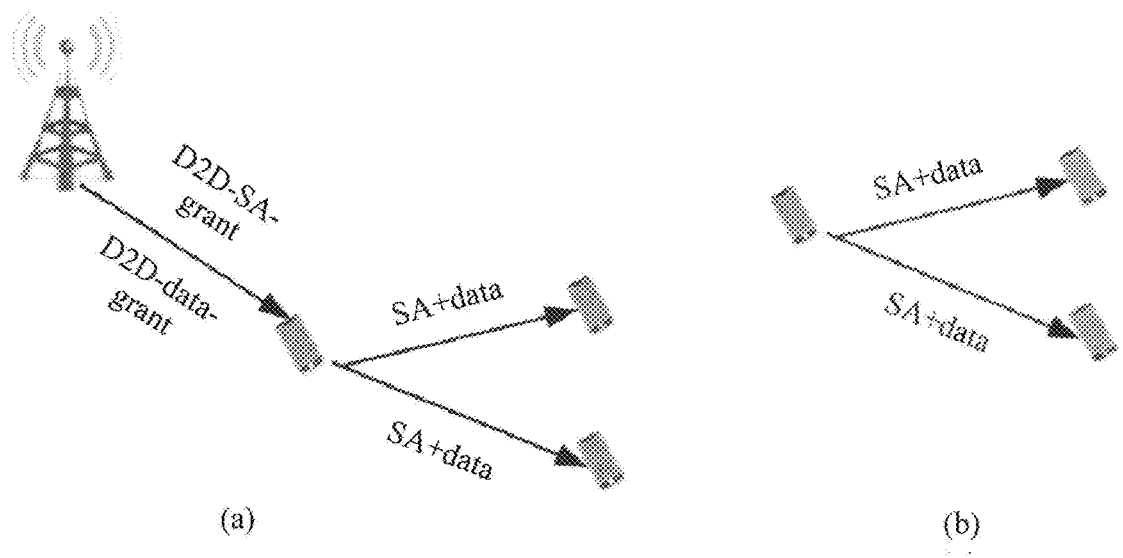
FIG. 1 shows a D2D communication transmission mechanism.

The D2D technology is discussed in 3GPP. In LTE Rel. 12, data is transmitted through broadcast in the D2D technology, and the D2D technology includes two features: discovery and communication. The discovery means that a terminal periodically broadcasts information, so that a user surrounding the terminal can detect the information and discover the user. The communication means that direct data transmission is performed between two terminals, and a mechanism of scheduling assignment (SA)+data is used, as shown in FIG. 1.

The SA is scheduling assignment information, which is state information used to indicate data sent from a D2D transmit terminal. The SA carries sidelink control information (SCI). The SCI includes time-frequency resource information of the data, modulation and coding scheme (MCS) information, and the like. A receive end can receive the service data based on an indication of the SCI.

The data is data, and is the service data sent by the D2D transmit terminal in a format indicated by the SCI and at a time-frequency resource location indicated by the SCI.

Figure 3:
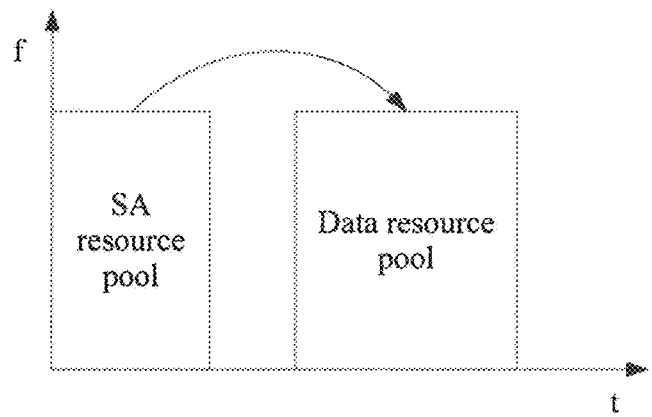
FIG. 3 is a schematic diagram of a D2D resource pool according to an embodiment of the present invention.

If the D2D terminal is in a coverage area of a cell, a transmission resource pool is allocated to the D2D terminal in a manner of configuration by a base station or in a preconfiguration manner for data transmission of the D2D terminal. The resource pool is a set of transmission resources, and is time-frequency resource information that is configured by the base station or is preconfigured for D2D transmission. As shown in FIG. 3, the base station may configure different resource pools such as a discovery resource pool, an SA resource pool, and a data resource pool. A transmission resource used for the data is indicated by the SCI in the SA. The terminal transmits a signal or listens for a signal in a corresponding resource pool based on resource pool information broadcast by the base station or based on preconfigured resource pool information, to implement D2D transmission.

The D2D system has two working manners: discovery and communication. A communication part is further divided into two working modes. Mode 1 is shown in (a) in FIG. 1, and Mode 2 is shown in (b) in FIG. 1. In Mode 1, a base station allocates a determined time-frequency resource in a resource pool to each D2D terminal for D2D transmission of the D2D terminal. In Mode 2, a D2D terminal randomly selects an SA resource from an SA resource pool, and randomly selects a data resource from a data resource pool for D2D transmission. A D2D receive terminal blindly detects SA in the SA resource pool, and then detects data on a corresponding time-frequency resource by using data time-frequency resource information indicated by SCI in the SA.

A feedback information transmission method in the embodiments of the present invention may be applied to the D2D communications system, and both a first terminal and a second terminal in the embodiments of the present invention are D2D terminals.

In an example application scenario, feedback information in the embodiments of the present invention may be applied to an Internet of Vehicles system. For example, vehicles travel in line, several vehicles form a fleet, and a first vehicle serves as a head of the fleet, and controls the entire fleet, for example, controls a speed of the entire fleet, controls a distance between vehicles, controls whether another vehicle is allowed to join, and controls a vehicle in the fleet to leave the fleet. Therefore, the vehicle at the head of the fleet needs to perform unicast communication with another vehicle in the fleet, and other vehicles in the fleet may also perform unicast communication. To ensure reliability of unicast communication transmission, a receive end needs to send feedback information. The vehicle at the head of the fleet may alternatively send a message to another vehicle in the fleet through broadcast or multicast, and each vehicle sends feedback information to the vehicle at the head of the fleet.

When the vehicle at the head of the fleet sends a message to a vehicle A in the fleet in a subframe n, the vehicle A sends a feedback message in a subframe n+k. If the vehicle A sends no data in the subframe n+k, the feedback message is separately sent on a feedback resource in the subframe n+k. If the terminal A sends data in the subframe n+k at the same time, there is a scenario in which the feedback message is sent on a feedback resource in the subframe, and a data message is sent on a data resource in the same subframe. The vehicle sends the feedback information and data information on different frequency domain resources of the same subframe. This increases a peak-to-average power ratio (PAPR) of the system, and consequently, an effective transmit power of the system is reduced, and a transmission distance is shortened.

The feedback information transmission method provided in a first aspect of the embodiments of the present invention is used to resolve a problem about how to perform multiplexing transmission when feedback information and data information are sent in a same subframe, so as to reduce a PAPR of a system.

Figure 4:
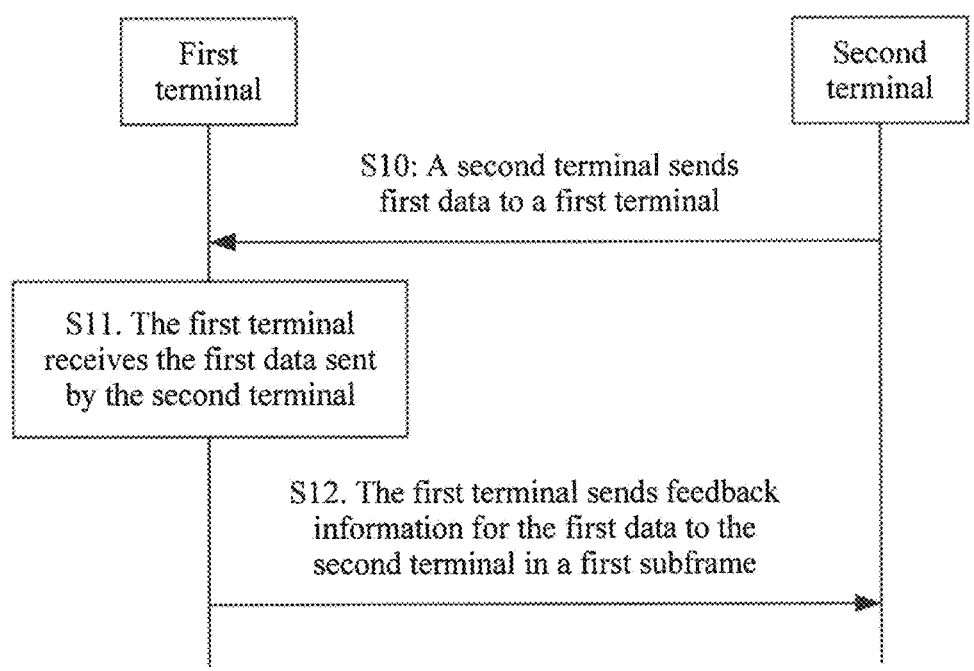
FIG. 4 is an interaction flowchart of a feedback information transmission method according to an embodiment of the present invention.

FIG. 4 is a flowchart of a feedback information transmission method according to an embodiment of the present invention. As shown in the figure, the feedback information transmission method includes but is not limited to the following steps.

Step S10: A second terminal sends first data to a first terminal.

In an embodiment, the first terminal and the second terminal may include but are not limited to a vehicle, a handheld device, or the like. The first terminal and the second terminal may communicate with a base station, or the first terminal and the second terminal may directly communicate with another terminal. Certainly, the first terminal and the second terminal may also directly communicate with each other.

Figure 8:
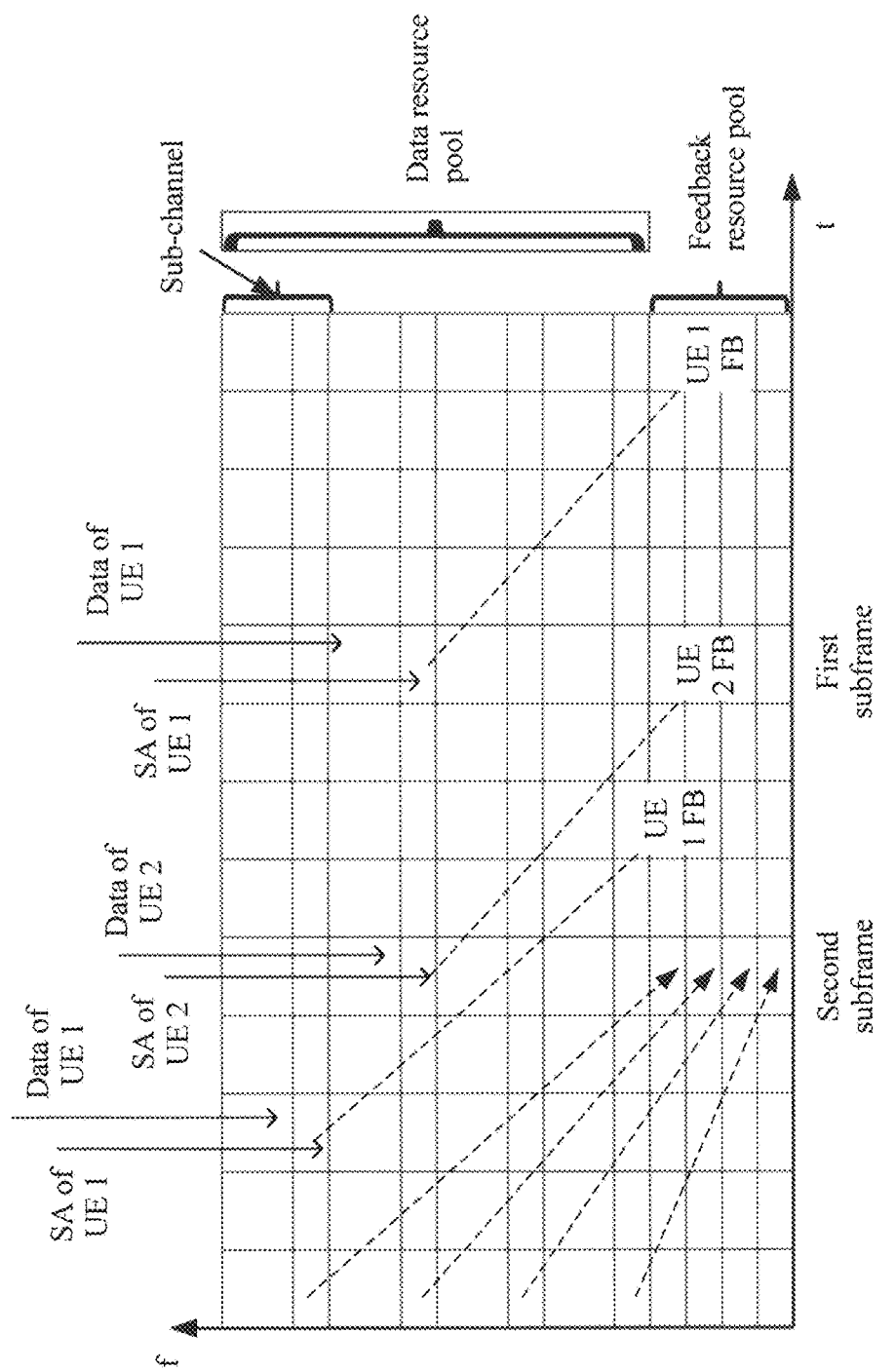
FIG. 8 is a schematic diagram of a time-frequency resource according to an embodiment of the present invention.

For example, that the second terminal may send the first data to the first terminal through unicast communication or broadcast communication, and the second terminal may send the first data to the first terminal in a second subframe, for example, a subframe n. FIG. 8 is a schematic diagram of a time-frequency resource according to an embodiment of the present invention. A horizontal coordinate represents time domain, and a vertical coordinate represents frequency domain. As shown in the figure, the second terminal sends the first data in the second subframe. In the time-frequency resource diagram shown in FIG. 8, an SA frequency domain resource in the second subframe carries SA of the second terminal, and a data frequency domain resource in the second subframe carries the first data of the second terminal.

Step S11: The first terminal receives the first data sent by the second terminal.

Step S12: The first terminal sends feedback information for the first data to the second terminal in a first subframe, where there is second data to be sent by the first terminal in the first subframe.

The feedback information is carried in sidelink control information SCI of the second data; or the feedback information is carried in a data packet carrying the second data.

In an embodiment, after receiving the first data sent by the second terminal, the first terminal needs to send the feedback information for the first data to the second terminal. Optionally, the feedback information may be an acknowledgement (ACK) character or a negative acknowledgement (NACK) character.

The first terminal sends the feedback information for the first data to the second terminal in the first subframe. There are a preset quantity of subframes between the first subframe and the second subframe, and the preset quantity may be configured by the base station or may be preconfigured. For example, if the first terminal receives, in the subframe n, the first data sent by the second terminal, the first terminal needs to send the feedback information to the second terminal in a subframe n+k, where k is a natural number greater than or equal to 1.

As shown in FIG. 8, the first terminal needs to send the feedback information for the first data to the second terminal in the first subframe. Specifically, optionally, the first terminal selects a frequency domain resource from a feedback resource pool in the first subframe, to send the feedback information to the second terminal. In addition, there is the second data to be sent by the first terminal in the first subframe. As shown in FIG. 8, there is the second data to be sent by the first terminal on a data frequency domain resource in the first subframe, and SA of the to-be-sent second data exists on an SA frequency domain resource in the first subframe. The SA carries SCI, and the SCI is used to indicate a time-frequency resource, a sending format, and the like of the second data.

If the feedback information and data information are sent on different frequency domain resources in a same subframe, a PAPR of a system increases, and consequently, an effective transmit power of the system is reduced, and a transmission distance is shortened. To reduce the PAPR, this embodiment of the present invention provides the following multiplexing manners:

The feedback information is carried in the sidelink control information SCI of the second data; or the feedback information is carried in the data packet carrying the second data.

In the foregoing two optional multiplexing manners, a high PAPR caused when an additional resource is used to transmit the feedback information can be avoided.

Optionally, the first terminal adds the feedback information to the SCI, and the SCI may further carry identification information such as ID information of the second terminal. A purpose of carrying the ID information of the second terminal is to: when two terminals send data to the first terminal in the subframe n at the same time, identify a specific terminal to which the feedback information is sent.

Optionally, the first terminal adds identification information of the first terminal, for example, ID information of the first terminal, to the SCI. A purpose of carrying the ID information of the first terminal is as follows: When the second terminal sends data to a plurality of terminals in the subframe n, the ID information added by the first terminal to the SCI is used to identify a specific terminal sending the feedback information and data information.

Optionally, if the feedback information is carried in the data packet carrying the second data, the data packet further carries the identification information of the first terminal and/or the identification information of the second terminal.

Likewise, if the second terminal sends the first data to the first terminal through unicast, when the first terminal sends the feedback information for the first data to the second terminal, the feedback information may be carried in the data packet of the second data, and the data packet further carries the identification information of the first terminal and/or the identification information of the second terminal.

Correspondingly, if a plurality of second terminals send first data to the first terminal, the first terminal needs to send feedback information to each second terminal. Feedback information for the plurality of second terminals is encapsulated in the data packet of the second data. For example, there are m pieces of feedback information that need to be sent. For each piece of feedback information, ID information of a corresponding second terminal needs to be carried, so that the second terminals determine which data is correctly received and which data is not correctly received.

Optionally, if the feedback information is carried in the data packet carrying the second data, quantity indication information of the feedback information is carried in the SCI of the second data, and the quantity indication information is used to indicate a quantity of feedback information carried in the data packet.

Specifically, if a plurality of second terminals send first data to the first terminal, the first terminal needs to send feedback information to each second terminal. The first terminal adds the quantity indication information (N bits) to the SCI, and the quantity indication information is used to indicate the quantity of feedback information, namely, a quantity of ACK/NACK information, included in the data packet of the second data.

Optionally, one second terminal sends first data to one first terminal, and the first terminal needs to send feedback information for the first data to the second terminal. For example, the first terminal receives the first data sent by the second terminal in the subframe n, and the first terminal sends the feedback information in the subframe n+k. When the first terminal needs to send second data in the subframe n+k at the same time, because the feedback information has a higher transmission priority, a feasible manner is that the first terminal sends only the feedback information on a feedback frequency domain resource in the first subframe, but sends no second data.

Through implementation of this embodiment of the present invention, the first terminal receives the first data sent by the second terminal, and the first terminal sends, in the first subframe, the feedback information for the first data to the second terminal. There is the second data to be sent by the first terminal in the first subframe. The feedback information may be carried in the sidelink control information SCI of the second data, or the feedback information may be carried in the data packet carrying the second data. The feedback information is carried in the SCI or the data packet carrying the second data, and the feedback information is not transmitted by using an additional frequency domain resource, so that the PAPR of the system can be reduced.

Figure 5:
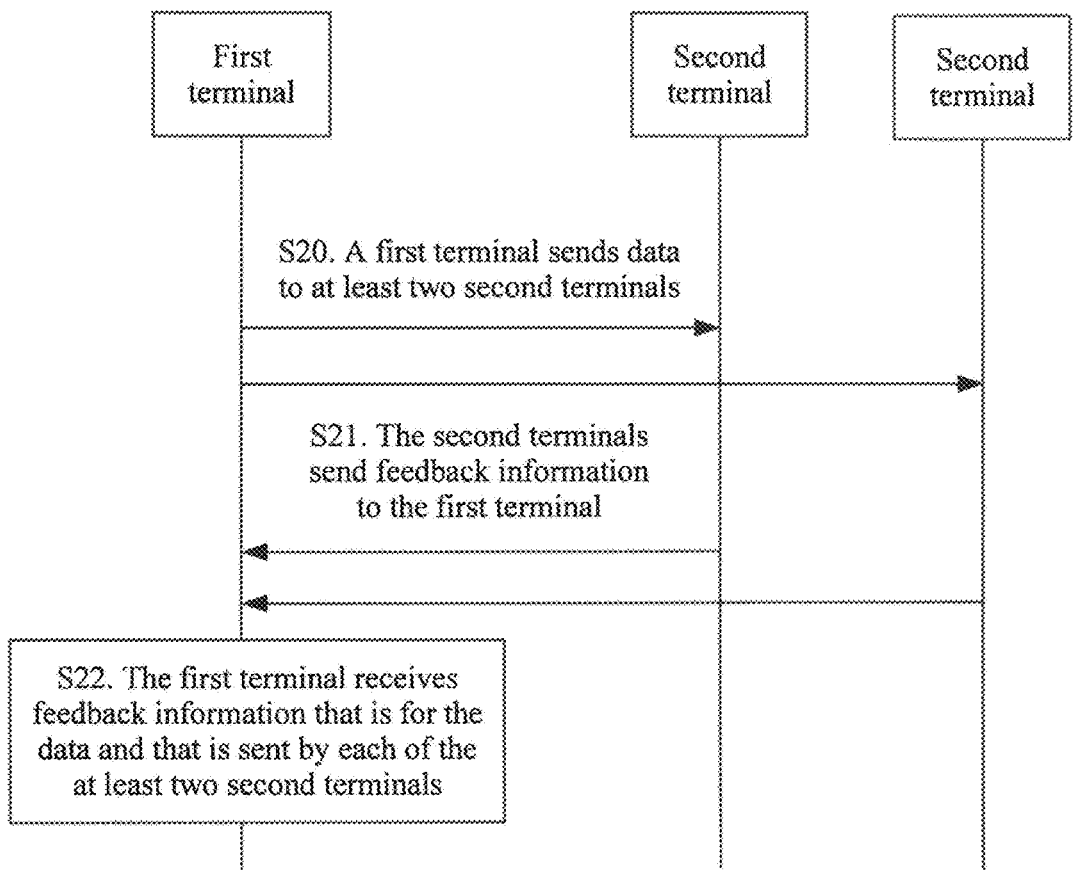
FIG. 5 is an interaction flowchart of another feedback information transmission method according to an embodiment of the present invention.

FIG. 5 is a flowchart of a feedback information transmission method according to an embodiment of the present invention. As shown in the figure, the feedback information transmission method includes but is not limited to the following steps.

S20. A first terminal sends data to at least two second terminals.

In an embodiment, the first terminal sends the data to the at least two second terminals through broadcast or multicast, and distances from the at least two second terminals to the first terminal are different. When all the second terminals send feedback information to the first terminal on a same time-frequency resource, a near-far effect is caused. To be specific, an information feedback power of a second terminal farther from the first terminal is far lower than that of a second terminal closer to the first terminal. Therefore, feedback information of the farther second terminal is drowned, and is very difficult to be correctly detected.

Figure 6:
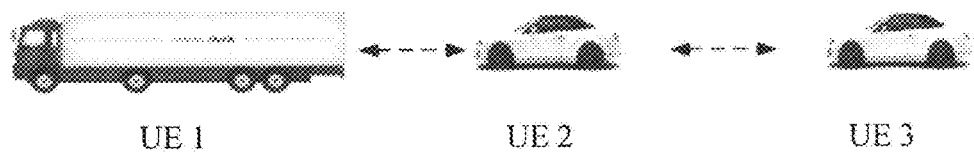
FIG. 6 is a schematic diagram of a D2D communication scenario according to an embodiment of the present invention.

An example application scenario is feedback information transmission in an Internet of Vehicles system. As shown in FIG. 6, when a vehicle at the head of a fleet sends data to a vehicle in the fleet through broadcast or multicast, all vehicles in the fleet need to send feedback information to the vehicle at the head of the fleet. If a feedback resource for the feedback information is in a one-to-one correspondence with a sending resource for sending data, a plurality of vehicles perform feedback by using a same feedback resource, and consequently, a feedback information transmission collision occurs, and performance is reduced.

In addition, if a same time-frequency resource is used for feedback information of a plurality of vehicles, but orthogonal transmission is performed in a code division manner, because distances from vehicles in the fleet to the vehicle at the head of the fleet are different, different vehicles send feedback information to the vehicle at the head of the fleet by using different powers, and consequently, a near-far effect is caused. To be specific, an information feedback power of a vehicle farther from the vehicle at the head of the fleet is far lower than that of a vehicle closer to the vehicle at the head of the fleet. Therefore, feedback information of the farther vehicle is drowned, and is very difficult to be correctly detected.

This embodiment of the present invention provides an improvement solution for the foregoing problem: The first terminal sends the data to the at least two second terminals through broadcast or multicast.

S21. The second terminals send feedback information for the data to the first terminal.

In an embodiment, after receiving the data sent by the first terminal, each second terminal needs to send feedback information for the received data to the first terminal. To avoid a near-far effect, time-frequency resources used by all the second terminals to send the feedback information are different. Specifically, optionally, when determining a time-frequency resource used for the feedback information for the received data, the second terminal may select the following several optional implementations.

Optionally, an identifier of the time-frequency resource occupied by the feedback information that is for the data and that is sent by the second terminal is determined by using identification information of the first terminal and/or identification information of the second terminal; or the time-frequency resource occupied by the feedback information that is for the data and that is sent by the second terminal is indicated by the first terminal; or the time-frequency resource occupied by the feedback information that is for the data and that is sent by the second terminal is a time-frequency resource corresponding to the second terminal in a feedback resource set, the feedback resource set includes at least two time-frequency resources, and one second terminal corresponds to one time-frequency resource.

S22. The first terminal receives feedback information that is for the data and that is sent by each of the at least two second terminals, where time-frequency resources occupied by the feedback information that is for the data and that is sent by all the second terminals are different.

In an embodiment, the first terminal receives the feedback information that is for the received data and that is sent by each of the at least two second terminals. Because the time-frequency resources occupied by the feedback information sent by all the second terminals are different, a near-far effect can be avoided.

Through implementation of this embodiment of the present invention, when the first terminal sends the data to the at least two second terminals through broadcast, a plurality of second terminals send feedback information for the data to the first terminal by using different time-frequency resources, so as to avoid a near-far effect caused when the plurality of second terminals perform feedback by using a same time-frequency resource.

Figure 7:
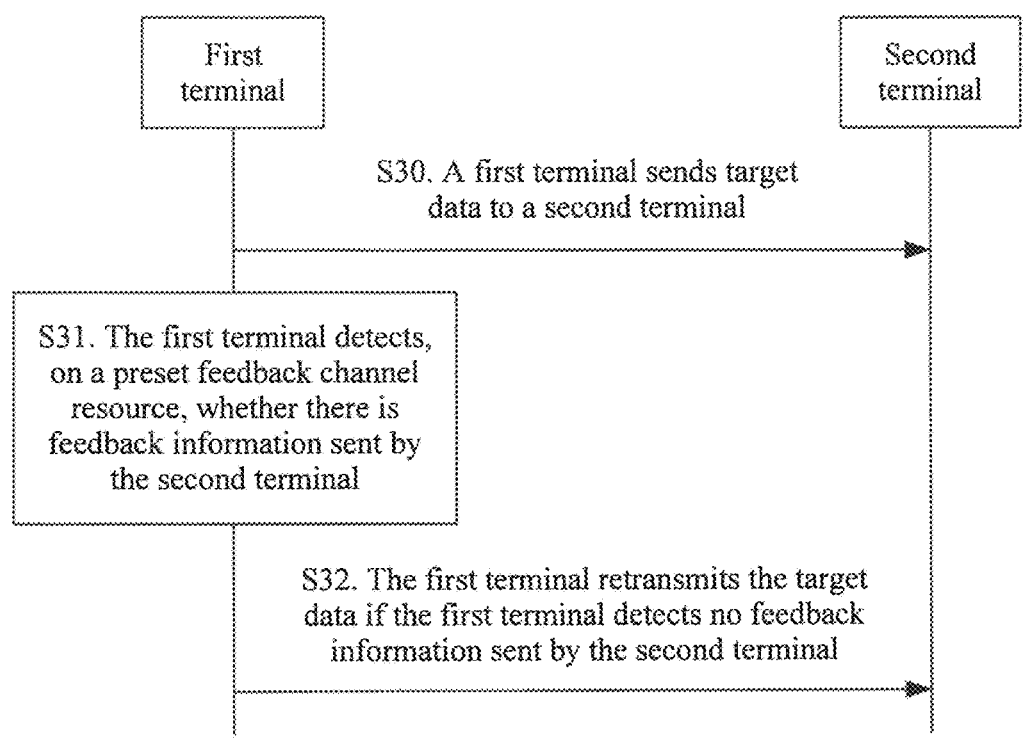
FIG. 7 is an interaction flowchart of still another feedback information transmission method according to an embodiment of the present invention.

FIG. 7 is a flowchart of a feedback information transmission method according to an embodiment of the present invention. As shown in the figure, the feedback information transmission method includes but is not limited to the following steps.

S30. A first terminal sends target data to a second terminal.

In an embodiment, after unicast transmission is introduced, there are two transmission manners in a system: unicast transmission and broadcast transmission. Feedback of a receive end is required in the unicast transmission manner, and no feedback of a receive end is required in the broadcast transmission manner. However, when a receive end fails to detect data, it is very difficult for the receive end to identify whether the data is transmitted through unicast or broadcast. Because broadcast transmission usually requires no feedback, and only unicast transmission requires feedback, a terminal cannot know whether feedback information needs to be sent. A transmit end of unicast transmission cannot receive feedback information of a receive end.

This embodiment of the present invention provides improvement based on the foregoing description. The improvement is mainly for a unicast transmission scenario, because when the first terminal sends the target data through broadcast, whether the second terminal correctly receives the target data or not, the second terminal does not need to perform feedback. In this embodiment of the present invention, the first terminal sends the target data to the second terminal in the unicast transmission manner.

S31. The first terminal detects, on a preset feedback channel resource, whether there is feedback information sent by the second terminal.

Optionally, the preset feedback channel resource is determined by using identification information of the first terminal and/or identification information of the second terminal; or the preset feedback channel resource includes a time-frequency resource between a first subframe and a second subframe, the first subframe is a predicted start location of the feedback information, and the second subframe is a predicted end location of the feedback information.

In an embodiment, after the second terminal receives the target data sent by the first terminal, if detection performed by the second terminal fails, the second terminal cannot identify whether the target data is transmitted in the unicast transmission manner or the broadcast transmission manner, and therefore the second terminal sends no feedback information.

Because the first terminal sends the target data in the unicast transmission manner, the first terminal detects, on the preset feedback channel resource, whether there is the feedback information sent by the second terminal.

Optionally, the preset feedback channel resource may be determined by using a UE ID of the first terminal and/or a UE ID of the second terminal.

Alternatively, the first terminal searches for feedback information in subframes [n+m, n+m+k], where n represents a moment at which the first terminal transmits the target data through unicast, n+m represents a first subframe location at which the feedback information may appear, and n+m+k represents a last subframe location at which the feedback information may appear.

S32. The first terminal retransmits the target data if the first terminal detects no feedback information sent by the second terminal.

In an embodiment, the first terminal retransmits the target data if the first terminal detects no feedback information sent by the second terminal. Through implementation of this embodiment of the present invention, when a receive end (namely, the second terminal) cannot identify unicast or multicast, the receive end cannot transmit feedback information. A transmit end (namely, the first terminal) may determine, by detecting whether there is feedback information, whether retransmission needs to be performed.

Through implementation of this embodiment of the present invention, the first terminal sends the target data to the second terminal through unicast. If the second terminal fails to detect the data, the second terminal cannot learn whether the data is transmitted through unicast or broadcast. Therefore, the second terminal cannot determine whether the feedback information needs to be sent. In this embodiment of the present invention, the second terminal sends no feedback information provided that the second terminal fails to detect the data. The first terminal detects, on the preset feedback channel resource, whether there is the feedback information sent by the second terminal, and automatically retransmits the data if no feedback information is detected, so that reliability of data transmission is improved.

The foregoing has described in detail the methods in the embodiments of the present invention. The following provides an apparatus in an embodiment of the present invention.

Figure 9A:
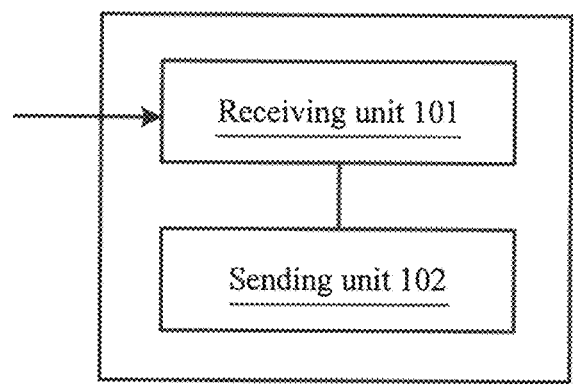
FIG. 9a is a schematic structural diagram of a feedback information transmission apparatus according to an embodiment of the present invention.
Figure 9B:
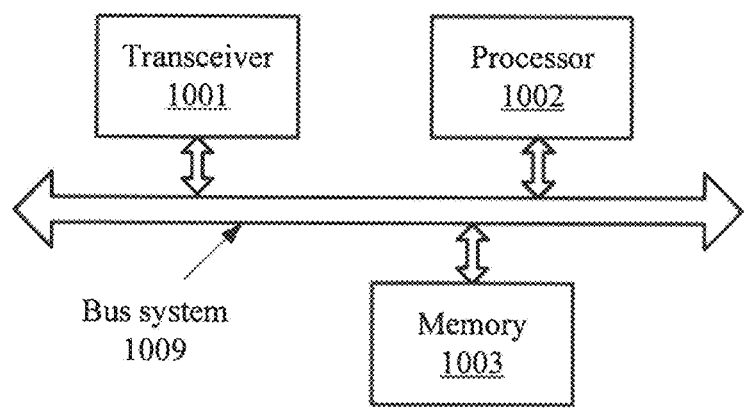
FIG. 9b is a schematic structural diagram of a feedback information transmission apparatus according to an embodiment of the present invention.

FIG. 9a and FIG. 9b are schematic structural diagrams of a feedback information transmission apparatus according to an embodiment of the present invention. The feedback information transmission apparatus in this embodiment of the present invention may be applied to the first terminal in the embodiment in FIG. 4, and the first terminal may be any D2D terminal.

As shown in FIG. 9a, the apparatus may include a receiving unit 101 and a sending unit 102.

The receiving unit 101 may be configured to perform a receiving action that is performed by the first terminal and that is described in the method in FIG. 4.

The sending unit 102 may be configured to perform a sending action that is performed by the first terminal and that is described in the method in FIG. 4.

The receiving unit 101 and the sending unit 102 may be implemented by using a transceiver 1001 in FIG. 9b.

For specific details, refer to the description in the foregoing method. Details are not described herein.

For example, the receiving unit 101 is configured to receive first data sent by a second terminal.

The sending unit 102 is configured to send feedback information for the first data to the second terminal in a first subframe, where there is second data to be sent by the first terminal in the first subframe.

The feedback information is carried in SCI of the second data; or the feedback information is carried in a data packet carrying the second data.

Optionally, the receiving unit is specifically configured to receive, in a second subframe, the first data sent by the second terminal, where there are a preset quantity of subframes between the first subframe and the second subframe, and the preset quantity is configured by a base station or is preconfigured.

Optionally, if the feedback information is carried in the data packet carrying the second data, the data packet further carries identification information of the first terminal and/or identification information of the second terminal.

Optionally, if the feedback information is carried in the data packet carrying the second data, quantity indication information of the feedback information is carried in the SCI of the second data, and the quantity indication information is used to indicate a quantity of feedback information carried in the data packet.

Correspondingly, as shown in FIG. 9b, the apparatus may include the transceiver 1001 and a processor 1002. The processor 1002 is configured to control an operation of the apparatus, including: performing time-frequency resource mapping (including receiving and/or sending) on the feedback information by using the transceiver 1001. Further, the apparatus may include a memory 1003. The memory 1003 may include a read-only memory and a random access memory, and is configured to provide an instruction and data for the processor 1002. The memory 1003 may be integrated into the processor 1002, or may be independent of the processor 1002. A part of the memory 1003 may further include a non-volatile random access memory (NVRAM). Components of the apparatus are coupled together by using a bus system. In addition to a data bus, the bus system 1009 further includes a power bus, a control bus, and a status signal bus. However, for clarity of description, various buses are marked as the bus system 1009 in the figure.

The procedure disclosed on a first terminal side in FIG. 4 in the embodiments of this application may be applied to the transceiver 1001 and the processor 1002. In an implementation process, steps of the implementation process of the apparatus can be implemented by using a hardware integrated logical circuit in the processor 1002, or by using instructions in a form of software. The processor 1002 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1003, and the processor 1002 reads information in the memory 1003 and completes the steps in procedures in the embodiments of the present invention in combination with hardware of the processor 1002.

Optionally, the transceiver 1001 is configured to receive first data sent by a second terminal.

The transceiver 1001 is further configured to send feedback information for the first data to the second terminal in a first subframe, where there is second data to be sent by the first terminal in the first subframe.

The feedback information is carried in SCI of the second data; or the feedback information is carried in a data packet carrying the second data.

Optionally, the transceiver 1001 is further configured to receive, in a second subframe, the first data sent by the second terminal, where there are a preset quantity of subframes between the first subframe and the second subframe, and the preset quantity is configured by a base station or is preconfigured.

Optionally, if the feedback information is carried in the data packet carrying the second data, the data packet further carries identification information of the first terminal and/or identification information of the second terminal.

Optionally, if the feedback information is carried in the data packet carrying the second data, quantity indication information of the feedback information is carried in the SCI of the second data, and the quantity indication information is used to indicate a quantity of feedback information carried in the data packet.

When the apparatus is user equipment, the apparatus may further include a structure, for example, an input device such as a keyboard or an output device such as a display.

Figure 10A:
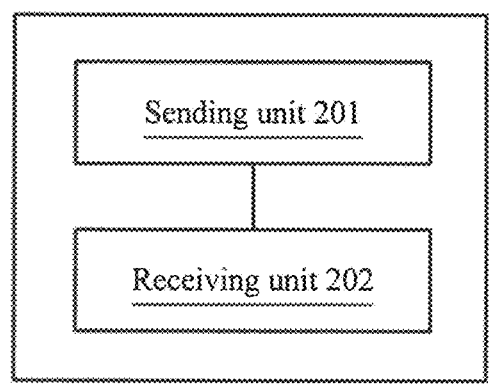
FIG. 10a is a schematic structural diagram of a feedback information transmission apparatus according to an embodiment of the present invention.
Figure 10B:
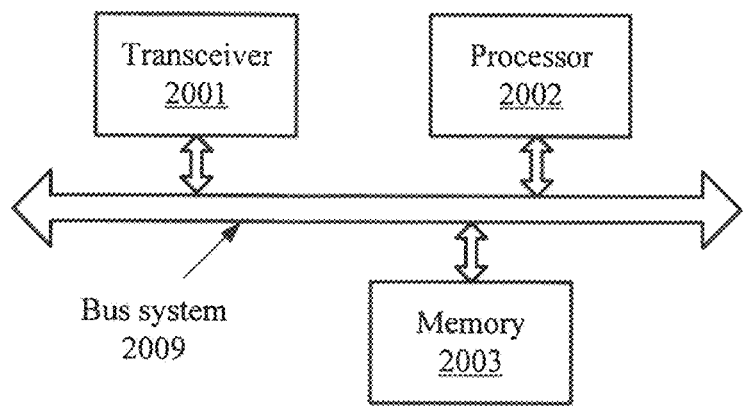
FIG. 10b is a schematic structural diagram of a feedback information transmission apparatus according to an embodiment of the present invention.

FIG. 10*a* and FIG. 10*b* are schematic structural diagrams of a feedback information transmission apparatus according to an embodiment of the present invention. The feedback information transmission apparatus in this embodiment of the present invention may be applied to the first terminal in the embodiment in FIG. 5, and the first terminal may be any D2D terminal. The first terminal sends data to at least two second terminals through broadcast, and the second terminal may also be a D2D terminal.

As shown in FIG. 10*a*, the apparatus may include a sending unit 201 and a receiving unit 202.

The sending unit 201 may be configured to perform a sending action that is performed by the first terminal and that is described in the method in FIG. 5.

The receiving unit 202 may be configured to perform a sending action that is performed by the first terminal and that is described in the method in FIG. 5.

The sending unit 201 and the receiving unit 202 may be implemented by using a transceiver 2001 in FIG. 10*b*.

For specific details, refer to the description in the foregoing method. Details are not described herein.

For example, the sending unit 201 is configured to send data to at least two second terminals.

The receiving unit 202 is configured to receive feedback information that is for the data and that is sent by each of the at least two second terminals, where time-frequency resources occupied by feedback information that is for the data and that is sent by all the second terminals are different.

Optionally, an identifier of a time-frequency resource occupied by the feedback information that is for the data and that is sent by the second terminal is determined by using identification information of the first terminal and/or identification information of the second terminal; or a time-frequency resource occupied by the feedback information that is for the data and that is sent by the second terminal is indicated by the first terminal; or a time-frequency resource occupied by the feedback information that is for the data and that is sent by the second terminal is a time-frequency resource corresponding to the second terminal in a feedback resource set, the feedback resource set includes at least two time-frequency resources, and one second terminal corresponds to one time-frequency resource.

Correspondingly, as shown in FIG. 10*b*, the apparatus may include the transceiver 2001 and a processor 2002. The processor 2002 is configured to control operations of the apparatus, including: sending the data to the second terminal by using the transceiver 2001, and receiving the feedback information that is for the data and that is sent by the second terminal. Further, the apparatus may include a memory 2003. The memory 2003 may include a read-only memory and a random access memory, and is configured to provide an instruction and data for the processor 2002. The memory 2003 may be integrated into the processor 2002, or may be independent of the processor 2002. A part of the memory 2003 may further include a non-volatile random access memory (NVRAM). Components of the apparatus are coupled together by using a bus system. In addition to a data bus, the bus system 2009 further includes a power bus, a control bus, and a status signal bus. However, for clarity of description, various buses are marked as the bus system 2009 in the figure.

The procedure disclosed on a first terminal side in FIG. 5 in the embodiments of this application may be applied to the transceiver 2001 and the processor 2002. In an implementation process, steps of the implementation process of the apparatus can be implemented by using a hardware integrated logical circuit in the processor 2002, or by using instructions in a form of software. The processor 2002 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 2003, and the processor 2002 reads information in the memory 2003 and completes the steps in procedures in the embodiments of the present invention in combination with hardware of the processor 2002.

Optionally, the transceiver 2001 is configured to send data to at least two second terminals.

The transceiver 1001 is further configured to receive feedback information that is for the data and that is sent by each of the at least two second terminals, where time-frequency resources occupied by feedback information that is for the data and that is sent by all the second terminals are different.

Optionally, an identifier of a time-frequency resource occupied by the feedback information that is for the data and that is sent by the second terminal is determined by using identification information of the first terminal and/or identification information of the second terminal; or a time-frequency resource occupied by the feedback information that is for the data and that is sent by the second terminal is indicated by the first terminal; or a time-frequency resource occupied by the feedback information that is for the data and that is sent by the second terminal is a time-frequency resource corresponding to the second terminal in a feedback resource set, the feedback resource set includes at least two time-frequency resources, and one second terminal corresponds to one time-frequency resource.

When the apparatus is user equipment, the apparatus may further include a structure, for example, an input device such as a keyboard or an output device such as a display.

Figure 11A:
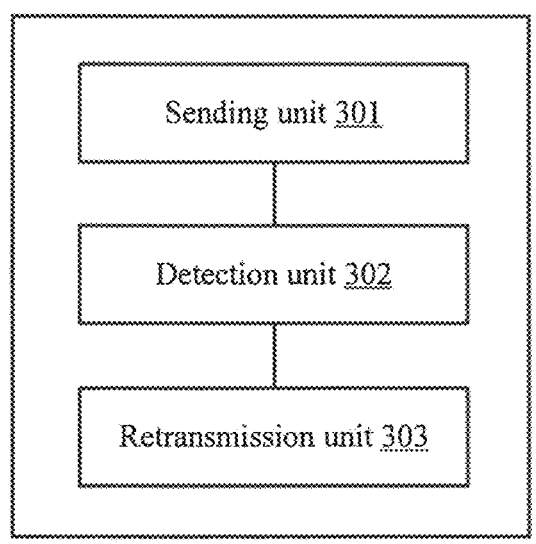
FIG. 11a is a schematic structural diagram of a feedback information transmission apparatus according to an embodiment of the present invention.
Figure 11B:
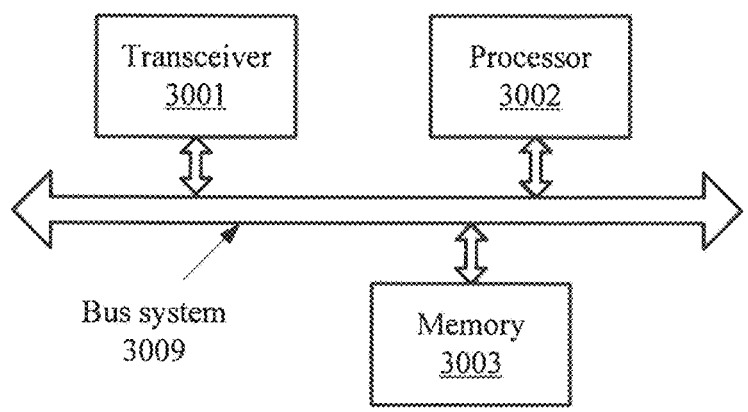
FIG. 11b is a schematic structural diagram of a feedback information transmission apparatus according to an embodiment of the present invention.

FIG. 11a and FIG. 11b are schematic structural diagrams of a feedback information transmission apparatus according to an embodiment of the present invention. The feedback information transmission apparatus in this embodiment of the present invention may be applied to the first terminal in the embodiment in FIG. 7, and the first terminal may be any D2D terminal. The first terminal sends data to a second terminal, and the second terminal may also be a D2D terminal.

As shown in FIG. 11a, the apparatus may include a sending unit 301, a detection unit 302, and a retransmission unit 303.

The sending unit 301 may be configured to perform a sending action that is performed by the first terminal and that is described in the method in FIG. 7.

The detection unit 302 may be configured to perform a detection action that is performed by the first terminal and that is described in the method in FIG. 7.

The retransmission unit 303 may be configured to perform a retransmission action that is performed by the first terminal and that is described in the method in FIG. 7.

The sending unit 301 and the retransmission unit 303 may be implemented by using a transceiver 3001 in FIG. 11b.

The detection unit 302 may be implemented by using a transceiver 3002 in FIG. 11b.

For specific details, refer to the description in the foregoing method. Details are not described herein.

For example, the sending unit 301 is configured to send target data to a second terminal.

The detection unit 302 is configured to detect, on a preset feedback channel resource, whether there is feedback information sent by the second terminal.

The retransmission unit 303 is configured to retransmit the target data if no feedback information sent by the second terminal is detected.

Optionally, the preset feedback channel resource is determined by using identification information of the first terminal and/or identification information of the second terminal; or the preset feedback channel resource includes a time-frequency resource between a first subframe and a second subframe, the first subframe is a predicted start location of the feedback information, and the second subframe is a predicted end location of the feedback information.

Correspondingly, as shown in FIG. 11b, the apparatus may include the transceiver 3001 and the processor 3002.

The processor 3002 is configured to control operations of the apparatus, including: sending the target data to the second terminal by using the transceiver 3001, and retransmitting the target data. Further, the apparatus may include a memory 3003. The memory 3003 may include a read-only memory and a random access memory, and is configured to provide an instruction and data for the processor 3002. The memory 3003 may be integrated into the processor 3002, or may be independent of the processor 3002. A part of the memory 3003 may further include a non-volatile random access memory (NVRAM). Components of the apparatus are coupled together by using a bus system. In addition to a data bus, the bus system 3009 further includes a power bus, a control bus, and a status signal bus. However, for clarity of description, various buses are marked as the bus system 3009 in the figure.

The procedure disclosed on a first terminal side in FIG. 7 in the embodiments of this application may be applied to the transceiver 3001 and the processor 3002. In an implementation process, steps of the implementation process of the apparatus can be implemented by using a hardware integrated logical circuit in the processor 3002, or by using instructions in a form of software. The processor 3002 may be a general purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 3003, and the processor 3002 reads information in the memory 3003 and completes the steps in procedures in the embodiments of the present invention in combination with hardware of the processor 3002.

Optionally, the transceiver 3001 is configured to send target data to a second terminal.

The processor 3002 is configured to detect, on a preset feedback channel resource, whether there is feedback information sent by the second terminal.

The transceiver 1001 is further configured to retransmit the target data if no feedback information sent by the second terminal is detected.

Optionally, the preset feedback channel resource is determined by using identification information of the first terminal and/or identification information of the second terminal; or the preset feedback channel resource includes a time-frequency resource between a first subframe and a second subframe, the first subframe is a predicted start location of the feedback information, and the second subframe is a predicted end location of the feedback information.

When the apparatus is user equipment, the apparatus may further include a structure, for example, an input device such as a keyboard or an output device such as a display.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium includes: any medium that can store program code, such as a read only memory (ROM), a random access memory (RAM), a magnetic disk, an optical disc, or the like.

What is claimed is:

1. A feedback information receiving method, comprising:
sending, by a first terminal apparatus, a data to at least two second terminal apparatus in a resource pool which is a set of time-frequency transmission resources for device-to-device (D2D) transmission; and
receiving, by the first terminal apparatus, feedback information in response to the data from one of the at least two second terminal apparatus, wherein an identifier of a time-frequency resource for the feedback information in response to the data from the one of the at least two second terminal apparatus is determined according to identification information of the first terminal apparatus and identification information of the one of the at least two second terminal apparatus, wherein frequency resources for at least two feedback information in response to the data from the at least two second terminal apparatus are different.

2. The method according to claim 1, wherein the time-frequency resource for the feedback information in response to the data from one of the at least two second terminal apparatus is a time-frequency resource corresponding to the one of the at least two second terminal apparatus in a feedback resource set, the feedback resource set comprises at least two time-frequency resources, and one of the at least two second terminal apparatus corresponds to one of the at least two time-frequency resources.

3. The method according to claim 1, further comprising:
sending, by the first terminal apparatus, the data to the at least two second terminal apparatus by multicast.

4. A feedback information transmission method, comprising:
receiving, by a second terminal apparatus, a data from a first terminal apparatus in a resource pool which is a set of time-frequency transmission resources for device-to-device (D2D) transmission;
determining, by the second terminal apparatus, an identifier of a time-frequency resource for feedback information in response to the data according to identification information of the first terminal apparatus and identification information of the second terminal apparatus; and
transmitting, by the second terminal apparatus, the feedback information to the first terminal apparatus on the time-frequency resource.

5. The method according to claim 4, wherein the frequency resource for the feedback information in response to the data is different from another frequency resource for another feedback information in response to the data, the data is sent from the first terminal apparatus to at least two second terminal apparatus, and wherein the at least two second terminal apparatus comprise the second terminal apparatus and another second terminal apparatus.

6. The method according to claim 4, wherein the time-frequency resource for the feedback information in response to the data is a time-frequency resource corresponding to the second terminal apparatus in a feedback resource set, the feedback resource set comprises at least two time-frequency resources, and one of the at least two second terminal apparatus corresponds to one of the at least two time-frequency resources, the at least two second terminal apparatus comprises the second terminal apparatus.

7. The method according to claim 4, wherein the data is from the first terminal apparatus to at least two second terminal apparatus by multicast, and the at least two second terminal apparatus comprise the second terminal apparatus.

8. A first terminal apparatus, comprising:
a transceiver, configured to send a data to at least two second terminal apparatus in a resource pool which is a set of time-frequency transmission resources for device-to-device (D2D) transmission; and
the transceiver, further configured to receive feedback information in response to the data from one of the at least two second terminal apparatus, wherein an identifier of a time-frequency resource for the feedback information in response to the data from the one of the at least two second terminal apparatus is determined according to identification information of the first terminal apparatus and identification information of the one of the at least two second terminal apparatus, wherein frequency resources for at least two feedback information in response to the data from the at least two second terminal apparatus are different.

9. The first terminal apparatus according to claim 8, wherein the time-frequency resource for the feedback information in response to the data from one of the at least two second terminal apparatus is a time-frequency resource corresponding to the one of the at least two second terminal apparatus in a feedback resource set, the feedback resource set comprises at least two time-frequency resources, and one of the at least two second terminal apparatus corresponds to one of the at least two time-frequency resources.

10. The method according to claim 8, further comprising the transceiver to:
send the data to the at least two second terminal apparatus by multicast.

11. A second terminal apparatus, comprising:
a transceiver, configured to receive a data from a first terminal apparatus in a resource pool comprising a set of time-frequency transmission resources for device-to-device (D2D) transmission;
a processor, coupled with the transceiver, configured to determine an identifier of a time-frequency resource for feedback information in response to the data according to identification information of the first terminal apparatus and identification information of the second terminal apparatus; and
the transceiver, configured to transmit the feedback information to the first terminal apparatus on the time-frequency resource.

12. The second terminal apparatus according to claim 11, wherein the frequency resource for the feedback information in response to the data is different from another frequency resource for another feedback information in response to the data, the data is sent from the first terminal apparatus to at least two second terminal apparatus, and wherein the at least two second terminal apparatus comprise the second terminal and another second terminal apparatus.

13. The second terminal apparatus according to claim 11, wherein the time-frequency resource for the feedback information in response to the data is a time-frequency resource corresponding to the second terminal apparatus in a feedback resource set, the feedback resource set comprises at least two time-frequency resources, and one of the at least two second terminal apparatus corresponds to one of the at least two time-frequency resources, the at least two second terminal apparatus comprises the second terminal apparatus.

14. The second terminal apparatus according to claim 11, wherein the data is from the first terminal apparatus to at least two second terminal apparatus by multicast, and the at least two second terminal apparatus comprise the second terminal apparatus.

\* \* \* \* \*